Fig. 1.

INVENTORS
BLAINE M. ALLISON
WILLIAM SCHMID
BY
Rule + Hoge
ATTORNEYS

July 14, 1959    B. M. ALLISON ET AL    2,894,284
INJECTION MOLDING MACHINES

Filed Sept. 9, 1954    8 Sheets-Sheet 4

INVENTORS
BLAIN M. ALLISON
WILLIAM SCHMID
BY
ATTORNEYS

INVENTORS
BLAINE M. ALLISON
WILLIAM SCHMID
BY
ATTORNEYS

July 14, 1959

B. M. ALLISON ET AL 2,894,284

INJECTION MOLDING MACHINES

Filed Sept. 9, 1954

INVENTORS
BLAINE M. ALLISON
WILLIAM SCHMID
BY
Rule & Hoge
ATTORNEYS

Fig. 8.

United States Patent Office 2,894,284
Patented July 14, 1959

2,894,284

INJECTION MOLDING MACHINES

Blaine M. Allison, Maumee, and William Schmid, Toledo, Ohio, assignors to Owens-Illinois Glass Company, a corporation of Ohio Application September 9, 1954, Serial No. 454,974

8 Claims. (Cl. 18—30)

The present invention relates to improvements in injection molding machines in which plasticized thermoplastic materials, such as polyethylene and polystyrene, are introduced into a plurality of molds simultaneously and cured therein prior to removal or discharge therefrom.

In commercial machines of the above character, as presently used, the feeding mechanism which delivers the molding material to the molds is idle for a very substantial part of the time owing to the fact that it delivers materials to one mold at a time or to a set of molds and then is idle until the material in the mold or molds has cured, the molds opened, the finished articles discharged therefrom and these same molds again closed and finally brought back to the charging position. Thus, it is abundantly apparent that with such an arrangement the injection capacity of the feeding mechanism cannot be and by no means is fully utilized.

An object of our invention is to avoid the above objections and utilize substantially the maximum feeding capacity of the charging mechanism. To this end our invention comprises basically a single set or group of molds and two movable sets of mold cores, or force plugs, the sets of cores being mounted upon a rotatable carrier disk which is operable to position the sets of cores, one set at a time, for cooperation with the molds. While one set of cores is cooperating with the cavity molds in forming and curing a predetermined number of articles, a corresponding number of finished articles is being removed from the other set of cores, or force plugs, by automatic means arranged at one side of the machine. Thus, the feeding mechanism for the molding material operates substantially at full capacity and additionally, the productive capacity of the molds is correspondingly increased.

A further object is the provision of novel and exceptionally efficient unscrewing mechanism arranged at each side of the machine and functioning to remove the articles from threaded force plugs or cores which constitute parts of the molds.

A further object of our invention is the provision of novel means for effecting any necessary orientation of chucks which constitute a part of the unscrewing mechanism to insure, for example, accurate registration of external flutes, or ribs on the articles and chucks, prior to movement of the latter into engagement with the articles.

Other objects will be in part apparent and in part pointed out hereinafter.

Our invention is illustrated as being incorporated in a more or less conventional type of injection molding machine which comprises (Figs. 1, 2, and 7) a base 15 supporting three upright frame members 16, spaced apart lengthwise of said base. At one end of this base a unit for plasticizing and supplying a molding material is mounted, such unit including a hopper 17 connected to a horizontal heating cylinder 18, within which a piston or the like (not shown), is operable to force the plasticized molding material 19 (Fig. 7) into and through the discharge end of an injection nozzle 20 which communicates with a plurality of mold cavities 21 by way of runners 22 (Fig. 5) and sprue channels 23. At the other end of the base 15 there is provided means for opening and closing the molds, such including a vertical piston motor 24 connected through a rack 25, and a meshing sector gear 26 (Figs. 1 and 2) and suitable linkage 27 to a horizontally movable bolster plate 28, the latter formed with a pair of guides 29 slidingly mounted upon a pair of parallel horizontal tie rods 30 which are suitably anchored in risers 31 on one of the frame members 16. Referring back to the material feeding unit, it will be observed in Figs. 1 and 2 that the hopper 17 and cylinder 18 are supported on a cross bar 17ª which in turn is mounted upon the aforementioned pair of rods 30. The foregoing structure, as stated previously, is more or less conventional.

In its broadest aspects this invention comprises a single injection nozzle for plasticized molding materials arranged to introduce such materal into a plurality of cavity molds simultaneously, one group of cavity molds being common to two groups of mold cores or force plugs and each group of the latter composed of cores corresponding in number to that of the cavity molds. These two groups of mold cores or force plugs are mounted upon a single carrier disk which is capable of oscillation about its horizontal axis through an angle of 180° to thereby alternately position each group of mold cores in molding and article discharging positions. Such oscillation of the mold core carrier is effected after the cavity molds have been moved axially away from the cores and the carrier itself has been moved axially to separate articles on the cores or force plugs from the sprues and and runners. Simultaneously with the introduction of molding material into the cavity molds and curing of the material therein, about one set of cores or force plugs, the finished articles, if they be screw-threaded bottle closures, for example, are being unscrewed from the other set of force plugs by automatic means positioned at one side of the axis of rotation of the mold core carrier. The article unscrewing mechanism incorporates means whereby unscrewing chucks forming a part thereof, may be properly oriented for registration with flutes or rib-like surface decorations on the skirt portion of the articles.

In the specfic embodiment of our invention, the above structure is utilized in duplicate in that we provide two mold-core-carriers arranged side by side in a common plane and oscillatable about horizontally spaced parallel axes and simultaneously deliver molding material to two independent sets or groups of cavity molds with the force plugs therein, while at the same time, finished articles are being removed from a corresponding set or group of mold cores or force plugs which have just been positioned at the article removing station.

Figure 5:
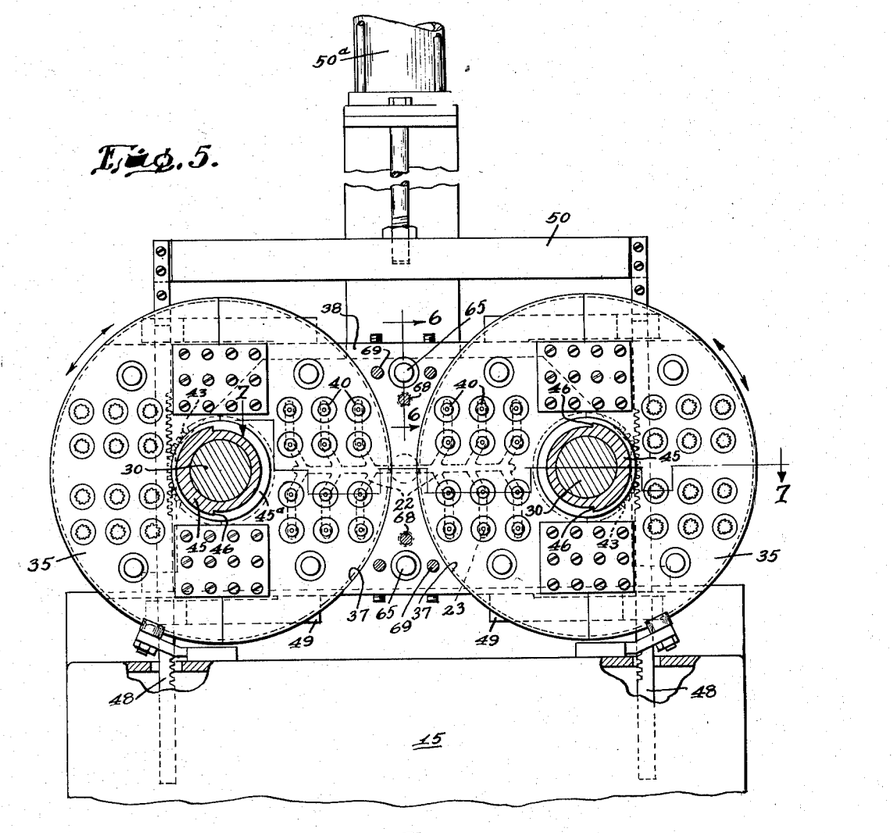
Fig. 5 is a vertical sectional elevational view taken substantially along the line 5—5 of Fig. 1.

In the illustrated form of our invention, it comprises a fixed die platen 32 mounted upon the central frame member 16 and suitably secured to the pair of horizontal tie rods 30. This platen (Fig. 7) carries the injector nozzle 20 and has an opening 33 therethrough connecting said nozzle and the molding material heating cylinder 18. Spaced forwardly of this fixed die platen is a stationary runner plate 34 which on its front face is provided with the runners 22 referred to heretofore (see Figs. 5 and 7) these runners communicating with the aforementioned sprue openings or channels 23 which are formed in the force plug or mold core carriers 35, the latter being in part spaced from the runner plate by means of a force plug back-up plate 36. It will be observed that these force plug carriers 35 have their marginal portions tapered or of generally frusto-conical shape and as shown in Fig. 5; the adjacent peripheral portions of these carriers are intended to snugly fit against opposed arcuate sealing surfaces 37 of a sealing center bar 38 which also closes and forms one wall of the runners 22 immediately adjacent the discharge end of the injector nozzle 20. That such structure provides effective sealing is obvious by reference to Fig. 7, in that closing pressure upon the plug carrier 35 brings the tapered surfaces into firm sealing contact with each other.

Forwardly of each force plug carrier 35 is a cavity mold plate 39 which is mounted for reciprocation lengthwise of the machine to and away from a position for cooperation with the mold cores 40 or force plugs which are mounted upon the aforementioned force plug carrier 35. The cavity mold plate is formed with two independent groups or sets of mold cavities 21, as explained heretofore, the number of such cavities corresponding to that making up one set or group of mold cores. A clamping plate 41 backs up the cavity mold plate 39 and is suitably attached to the bolster plate 38 so that it moves in effect as an integral part of the latter incident to opening and closing of the molds.

As pointed out previously, each of the force plug carriers 35 supports two diametrically opposed groups or sets of force plugs 40 which are intended for successive positioning at the charging and curing station so that while articles are being formed in one group of cavity molds, the finished articles are being removed from the force plugs comprising the second set or group. To this end, each force plug carrier 35 is journaled upon one of the tie rods 30 and includes a hub 42, one end of which substantially abuts the fixed die platen 32, while the other end is normally substantially in the plane of the meeting faces of the cavity mold plate 39 and clamping plate 41. A gear 43 is attached to the plug carrier, being telescoped over one end of the hub 42 and secured to the latter by a bolt 44, or some other suitable device. At the opposite end of this hub from said gear 43 is a stop collar 45 which is formed with a pair of substantially diametrically opposed abutments 46, these being designed for engagement in alternation with a stop finger 47, carried by the clamping plate 41. This stop collar as will be observed, is formed at its outer end with a continuous radial flange 45ª, which is intended to be engaged by said stop finger 47 at a predetermined stage of the mold opening operation and for a purpose which will become apparent hereinafter. It will be observed that this specific structure is provided in duplicate so that effective control of oscillation and final positioning of the force plug carriers 35 may be attained.

The mechanism for oscillating these force plug carriers through an angle of 180° (Figs. 1, 5, and 7) comprises a pair of vertical rack bars 48 running in mesh with the aforementioned gears 43 and mounted in guides 49, said rack bars at their upper ends being attached to a cross bar 50 which in turn is suitably connected to an air cylinder 50ª or the like, the latter functioning to reciprocate these rack bars as desired and thereby move the groups of mold cores or force plugs between article forming and discharging positions, or stations.

Figure 7:
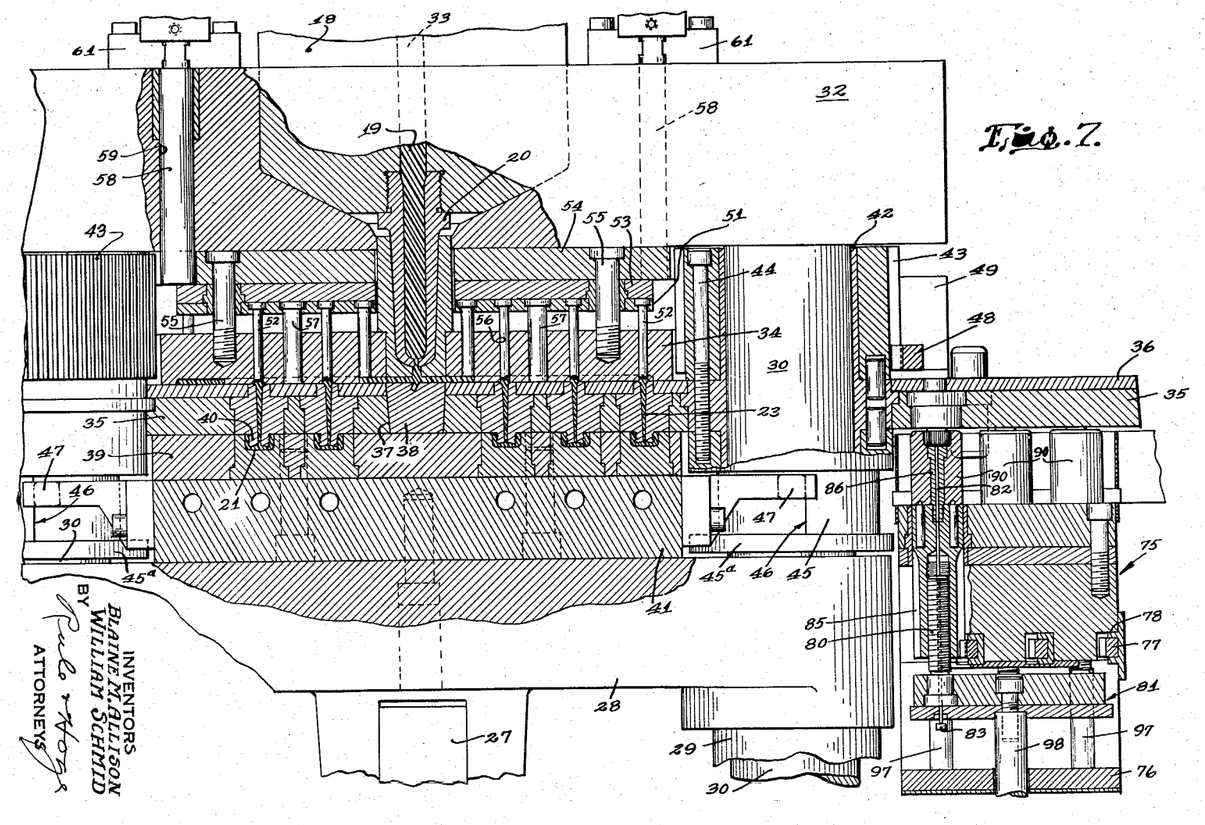
Fig. 7 is a sectional view with parts in elevation taken substantially at the line 7—7 of Fig. 5.

With the molding elements positioned as shown in Fig. 7, the molding material is injected under pressure into two sets or groups of cavity molds and cured therein. Immediately upon removal of the cavity mold plate 39, the force plug carriers are moved axially, severing the small end of the sprues 23 from the formed articles and leaving the runners and said sprues joined to the material immediately adjacent the discharge end of the injector nozzle 20. Ejection of these runners and sprues from the channels in the runner plate and separation from the remaining material, is effected by mechanism including an ejector plate 51 (Fig. 7) carrying a plurality of knockout or ejector pins 52 and mounted upon a retainer plate 53. This ejecting mechanism lies between the aforementioned runner plate 34 and an anchor plate 54, the latter being connected to the runner plate by means of bolts or screws 55. As shown, the runner plate is formed with a plurality of transverse openings 56 in which the ejector pins 52 are mounted for reciprocation. Plate resetting rods 57 are carried by the ejector plate 51 and project through openings in the runner plate in zones between the runner channels, the inner ends of these rods 57 being designed for engagement with the plug back-up plate 36 when the mold parts are closed so that the ejector pins 52 (Fig. 7) will be completely retracted and not be in position to close or block the runner channels.

Figure 3:
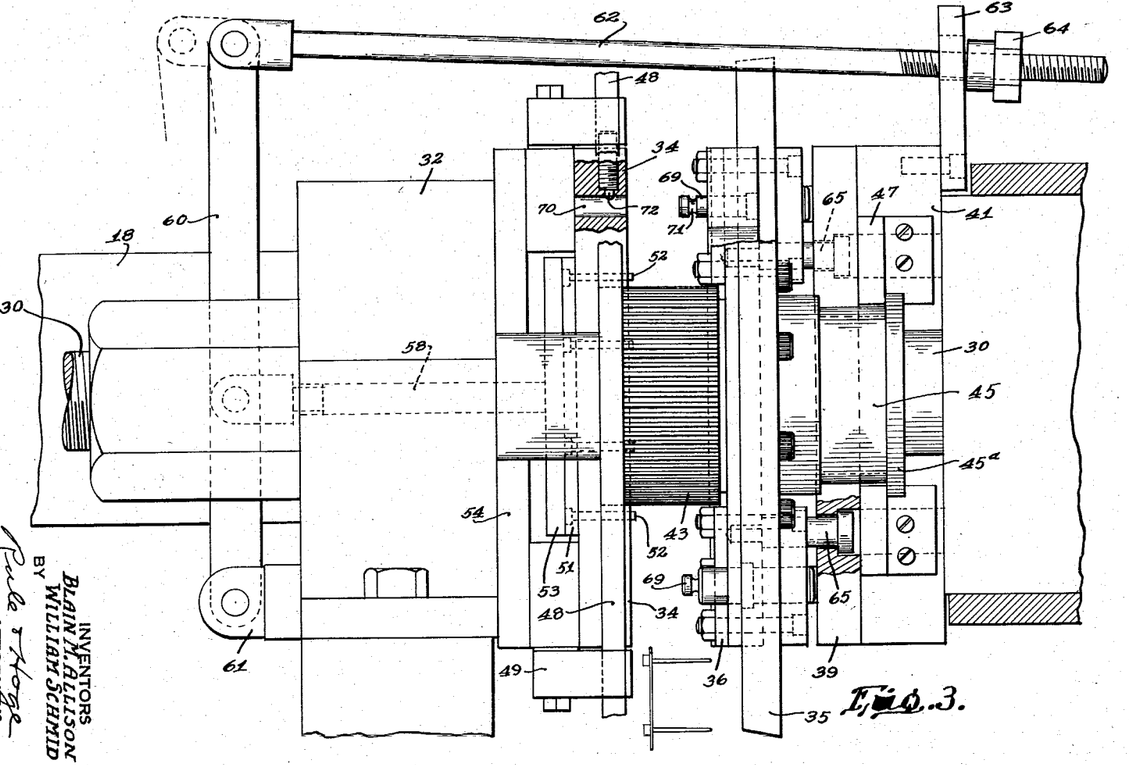
Fig. 3 is a fragmentary side elevational view.

Forward movement of the ejector plate 51 for the purpose of removing the runners and sprues as explained above, is obtained by mechanism including a pair of push rods 58 (Figs. 3 and 7) which are guided in openings 59 in the fixed die platen 32 and at their outer ends are connected to levers 60, the latter being pivoted at their lower ends to brackets 61 and at their upper ends to operating rods 62 which extend forwardly of the machine and are loosely received in up-standing stop fingers 63 on the movable bolster plate 28. The extreme end portions of these actuating rods 62 are screw-threaded and carry adjustable stop nuts 64 which incident to a predetermined extent of opening of the molds, engaging the stop fingers 63 and result in axial forward movement of the ejector rods 58 with the result that the ejector plate 61 advances and removes the runners and sprues from the runner plate.

Figure 6:
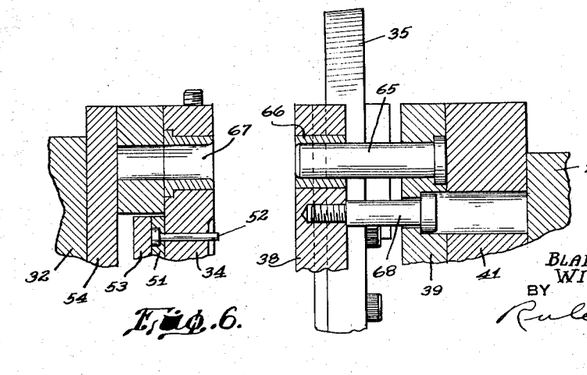
Fig. 6 is a detail sectional elevational view taken substantially at the line 6—6 of Figs. 4 and 5 showing both the stationary and movable portions of the mold guiding means with the movable member spaced from the stationary portion.

Maintenance of proper alignment of the runner plate, force plug carrier, cavity mold plate, etc., at all times, is effected through the structure shown in Fig. 6, wherein guide pins 65, there being a pair of these spaced apart vertically (see Fig. 5), carried by the cavity mold plate and projecting through guide openings 66 in the sealing center bar 38, and aligned guide openings 67 in the runner plate 34. Additionally, connecting pins 68 secure the cavity mold plate and sealing center bar 38 together in such fashion that the cavity mold plate 39 may move relative to said sealing center bar 38 and the rear clamping plate 41, utilizing said connecting pins as guides for that movement. At each side of each of the guide pins 65 (Figs. 3 and 5) is a puller pin 69, which is in alignment with a recess 70 in the runner plate 34. The puller pin is formed with an annular groove 71 near its outer end to receive a spring-pressed detent 72 which projects radially into said guide opening 70. This mechanism is intended to normally and effectively hold the sealing center bar 38 in snug contact with the runner plate 34 until the force plug carriers 35, as well as the cavity mold plate 39, have moved away from and broken contact between the force plug carriers 35 and said sealing center ber 38. This will become more obvious in the résumé of the mode of operation.

Figure 1:
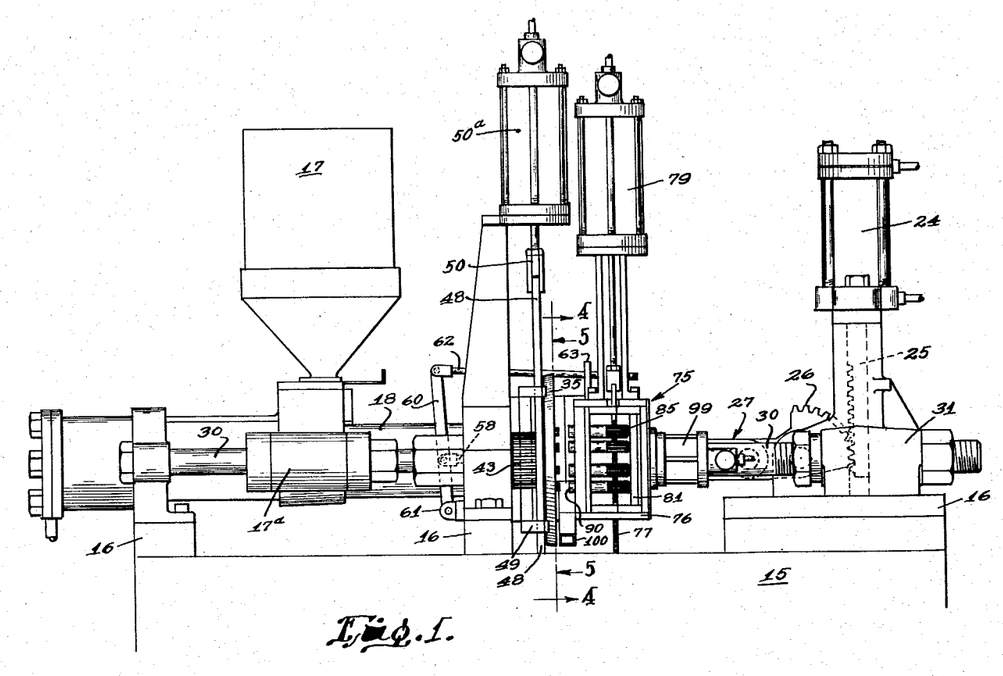
Fig. 1 is a side elevational view of an injection molding machine incorporating our invention.
Figure 2:
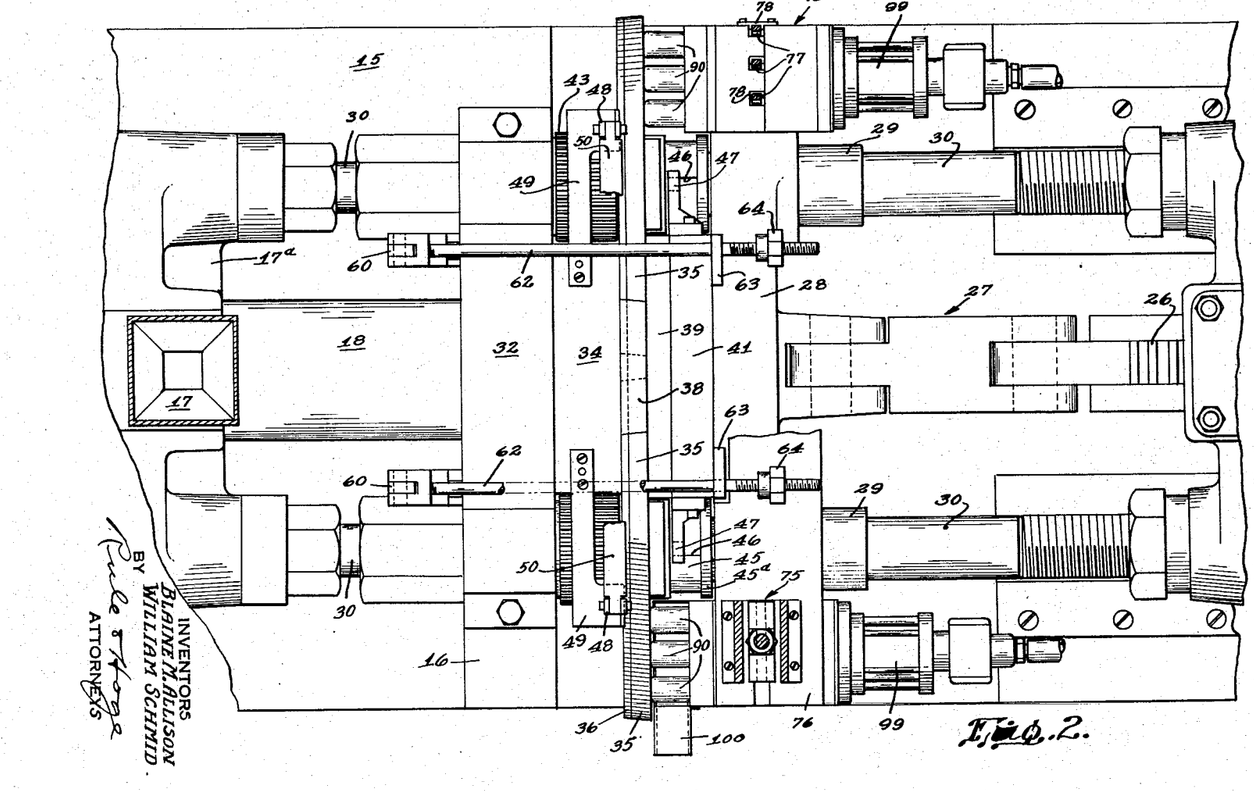
Fig. 2 is a fragmentary plan view thereof.
Figure 4:
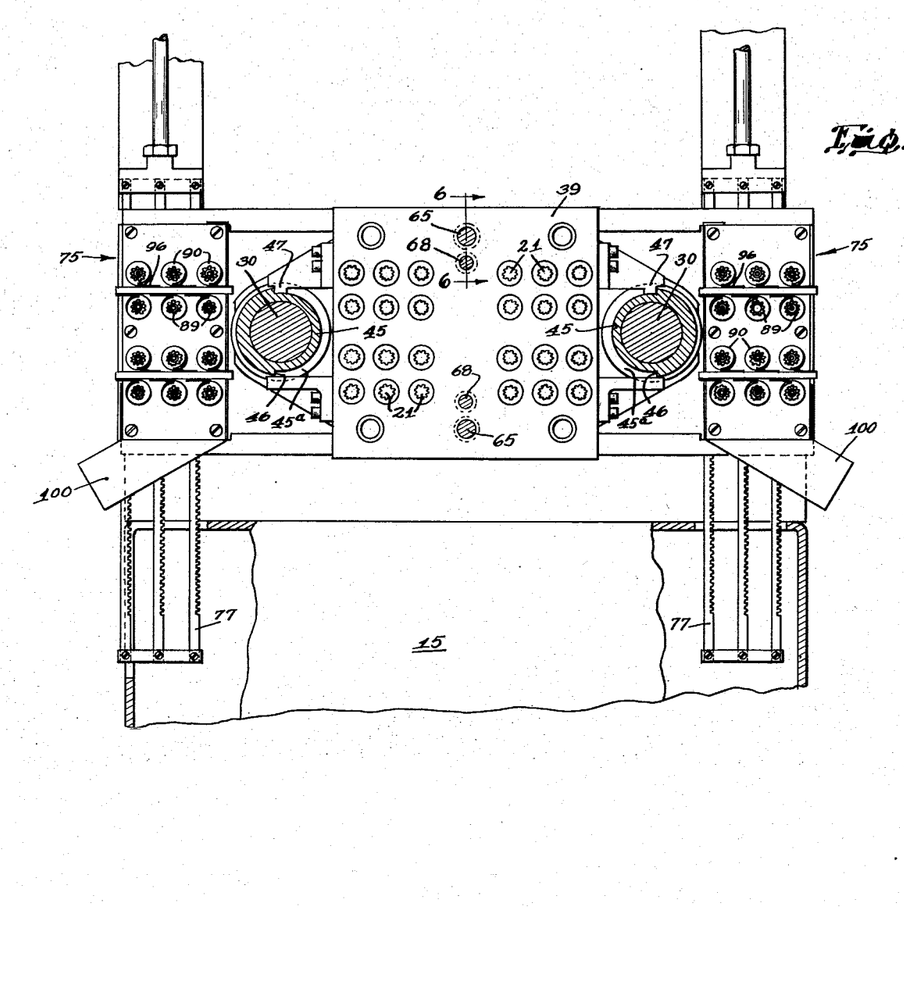
Fig. 4 is a vertical sectional elevational view taken substantially along the line 4—4 of Fig. 1.

As has been pointed out briefly in the foregoing description, the mold core carriers 35 in one position present a group of mold cores or force plugs with articles attached thereto, for removal by means of an automatic device 75, one of which is arranged at either side of the machine, as best illustrated in Figs. 1 and 4. When, as in the illustrated embodiment of our invention, the articles being produced, are internally threaded container closures having the skirt portions fluted or ribbed externally, the article removing device 75 incorporates means for properly orienting internally fluted, or ribbed unscrewing chucks, so that the ribs on the chucks will perfectly match or register with the spaces between the ribs or flutes on the closures prior to actual physical interengagement of the chucks and closures.

Figure 8:
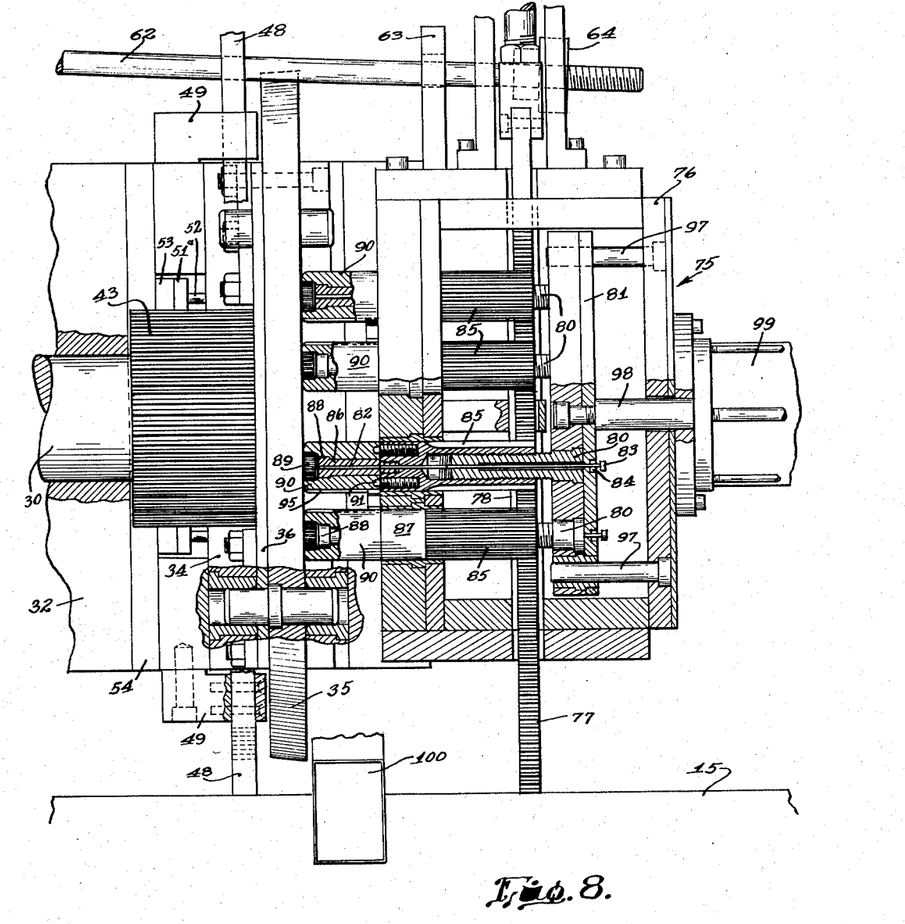
Fig. 8 is a fragmentary vertical sectional view of the article unscrewing mechanism.
Figures 10, 11:
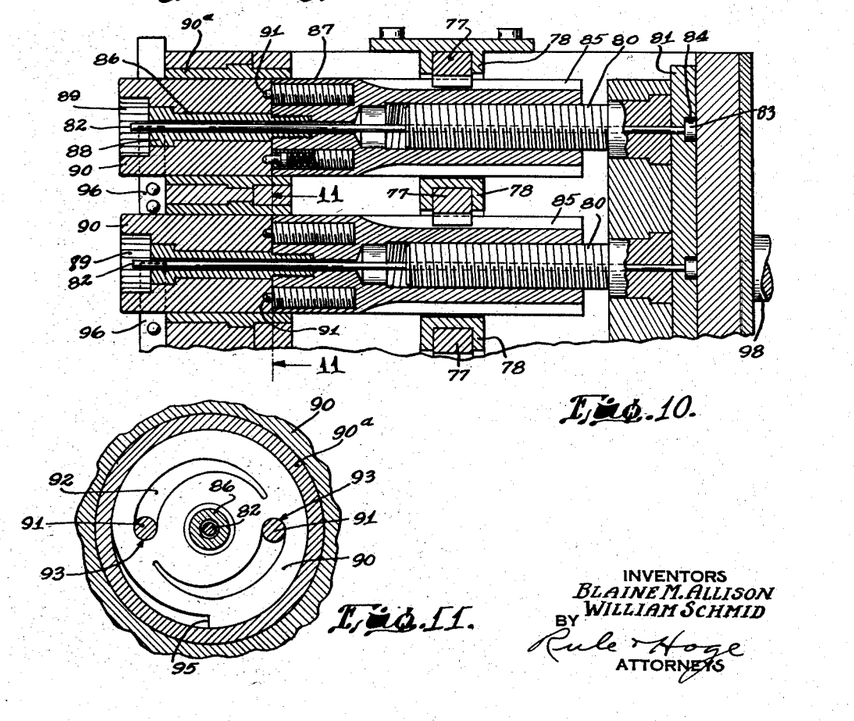
Fig. 10 is an enlarged detail sectional view taken substantially at the line 10—10 of Fig. 9.
Fig. 11 is a sectional view taken substantially at the line 11—11 of Fig. 10.

Each of the article removing devices 75 (Fig. 8) comprises an open frame 76 within which a plurality of chucks and ejector pins are mounted for movement into and out of engagement with articles carried by the force plugs. A plurality of vertical rack bars 77 mounted in guides 78 and operable by means of air motors or cylinders 79, are utilized to effect rotation and axial movement of the chucks. Since the several chuck and ejector pin units are identical in construction and operation, the following detailed description will largely be directed to one such unit only, as best shown in Figs. 8, 10, and 11. Each such unit includes a fixed externally threaded rod 80 extending forwardly from a carrier member 81, or back-up plate, said rod 80 having an axial bore accommodating an ejector pin 82 which is provided at one end with a head 83 receivable in a recess 84 in one face of said carrier member 81. Incidentally, the pitch of the screw threads on said rod is identical with that of the screw threads on the articles which are to be removed from the force plugs for obvious reasons. Threaded upon this rod is an elongated gear 85 or pinion, which runs in mesh with one of the aforementioned rack bars 77 and at its forward end is connected to an axially extending chuck carrier 86, said carrier being screw-threaded axially into a head-like extension 87 at the forward end of the gear or pinion 85. This chuck carrier 86 includes an enlarged head portion 88 (Fig. 10) which lies flush with the chuck recess 89 and forms the inner end wall thereof, in addition to securely holding the chuck 90 so that its inner end frictionally engages the adjacent end of the aforementioned head portion 87. The chuck 90 also is rotatably and axially movable in a bearing 90ᵃ. A pair of diametrically opposed spring detents 91 carried by the end wall of said head portion 87, is receivable at times in a pair of arcuate grooves 92 in the adjacent abutting face of the chuck 90. These grooves (Fig. 11) provide a pair of stops 93 at one end and the width of these grooves gradually diminishes in width toward the other end so that when the gear or pinion 85 is rotated in one direction, the detents ride freely through and thence out of the grooves 92 permitting some degree of rotation of the gear independently of the chuck, whereas rotation of the gear or pinion in the reverse direction, brings the detents into engagement with the abutments 93 so that both the gear and chuck rotate together as a unit to unscrew the articles.

Figure 9:
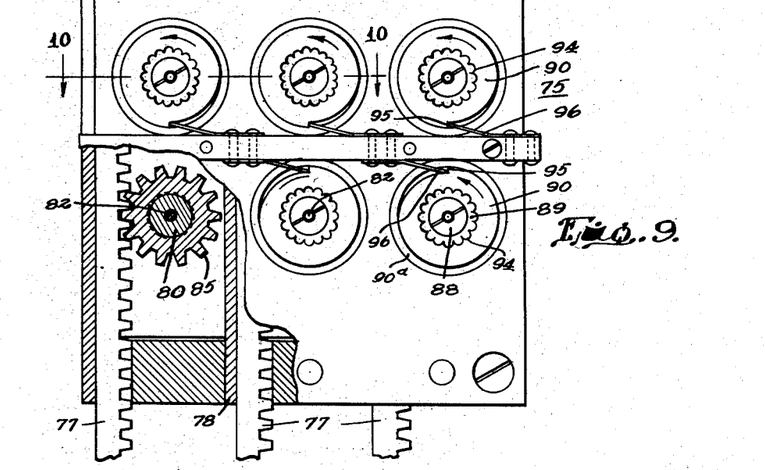
Fig. 9 is a fragmentary elevational view with parts in section illustrating the article unscrewing mechanism and means for positioning the unscrewing chucks for engagement with the articles.

As shown in Fig. 9, these chucks may well be formed with an annular series of ribs or flutes 94 which are intended to register with corresponding decorative formations on the exterior of the closure skirt. In order that the chucks may be properly oriented prior to initial engagement with the closures, the rack bars move downwardly, rotating the gears 85 and chucks 90 in a counter-clockwise direction until abutments 95 strike the free end of leaf springs 96 or the like. The abutment 95 and springs 96 are so positioned in relation to one of the ribs in the chuck 90 and cavity mold, that when the abutment and spring are interengaged, accurate orientation will have been accomplished.

The carrier member 81 (Figs. 1, 8, and 10) is mounted upon guide pins 97 and connected by means of a piston rod 98 to an air cylinder or piston motor 99 which operates to move the chucks into and out of engagement with the articles on the force plugs, and additionally, to actuate the ejector pins 82. A chute 100 suitably placed in relation to each of the article removing devices, directs the articles as they are discharged from the machine to a receptacle (not shown).

Briefly reviewing the operation of this machine, it will be assumed as a starting point that the molds are closed and the parts are positioned as illustrated in Fig. 7. The feeding device injects plasticized molding material into two groups or sets of molds by way of the runner channels and sprue openings. This material remains in these molds at the charging stations until sufficient curing has been effected. Thereupon, the air cylinder 24 (Fig. 1) or motor, operates to retract the bolster plate 28 and with it, the rear clamping plate 41 and cavity mold plate 39. This operation frees the articles from the cavity molds and leaves them attached to the force plugs 40 or mold cores. Following this operation the force plug carriers 35 are moved away from the runner plate 34, thereby breaking the small tip ends of the sprues from the articles on the force plugs. Immediately following a predetermined extent of such movement of these force plug carriers the sealing center bar 38 is moved away from the injection nozzle 20, but to a lesser degree than the force plug carriers so that contact between these elements is broken. This, as will be apparent presently, facilitates unimpeded oscillation of the force plug carriers. The next step is the ejection of the runners and sprues, such being obtained by movement of the two levers 60 (Figs. 3 and 7) which projects the push rods 58 forwardly against the ejector retainer plate 53, such in turn resulting in projection of the ejector pins 52 through openings in the runner plate 34. This effectively and easily breaks the runner from the material in the discharge opening of the ejector nozzle 20 after which the runners and sprues, as a single unit, fall by gravity from the machine. At this point the air cylinder 50ᵃ (Figs. 1 and 5) operates through rack bars 48 and the gears 43, to rotate both force plug carriers 45 through an angle of 180° to thereby position the group of force plugs with the cured finished articles thereon in proximity to the article removing devices. By this same operation, the force plugs, from which articles have just been removed, are returned to the charging stations adjacent the injection nozzle 20 as indicated in Fig. 7.

At the article removing station and with the axes of the chucks and corresponding group of force plugs in alignment, the rack bars 77 are moved downwardly by means of air cylinders 79 of which there are two (one for each set of three rack bars), such effecting rotation of the chucks so that any flutes or ribs thereon will be properly oriented in relation to similar surface formations on the skirt portions of the closures or such articles. This downward movement of the rack bars also advances the chucks 90 toward the caps, actual chucking being effected by means of the air cylinder 99 which advances the carrier member 81 and with it the chucks 90 so that the latter are telescoped over the articles on the force plugs. Immediately the rack bars are moved upwardly, reversing the direction of rotation of the chucks, and effecting unscrewing of the closures from the force plugs. Thereafter, the carrier member 81 is withdrawn by means of the air motor 99 until the head portions 83 of the ejector pins 82, come in contact with the frame 76 and thereby cause relative axial movement between said ejector pins and the chucks, as best shown in Fig. 10. By this operation the articles are ejected from the chucks and fall by gravity through chutes 100 to cartons or such receptacles (not shown).

Modifications may be resorted to within the spirit and scope of the appended claims.

We claim:

1. In an injection molding machine of the character described, a pair of disk-like carriers for threaded cores arranged side by side and positioned with their axes extending horizontally and arranged in parallel horizontal spaced relationship, two diametrically opposed sets of threaded cores on corresponding faces of each of the carriers, a nozzle common to the several sets of cores for delivering plasticized molding material, said nozzle positioned medially between the axes of said carriers, two sets of cavity molds wherein each set corresponds in number to one of the sets of threaded cores, and one each of the sets of cavity molds positioned in a zone generally disposed between the axes of one of said carriers and said nozzle, said cavity molds communicating with the nozzle through runners and sprue openings in the threaded cores and carriers therefor, means for effecting simultaneous oscillation of said carriers in opposite directions about their axes, to thereby simultaneously position two adjacent sets of cores for cooperation with the two sets of cavity molds while the other two remotely positioned sets of cores are in an article discharging position, and automatic means for removing the articles from said other set of cores.

2. In an injection molding machine of the character described, a stationary runner plate having a central horizontal opening for the introduction of plasticized molding material into forming molds, a disk-like carrier for force plugs rotatable about a horizontal axis, two independent diametrically opposed groups of force plugs on one face of said carrier, means for oscillating the carrier through an angle of approximately 180° to thereby position the force plugs one group at a time in proximity to said runner plate, a cavity mold plate movable only in the direction of the axis of rotation of the force plug carrier and having a plurality of mold cavities corresponding in number to that of the force plugs constituting one group, said runner plate and plug carrier formed with runner channels and sprue openings respectively through which the molding material may be distributed to the mold cavities, means operable following the delivery of molding material to the cavities and curing of same therein for moving the group of cavity molds axially away from the force plugs and then axially moving the force plug carriers to break the sprues from articles attached to the force plugs, ejector mechanism for separating the runners and sprues from the runner plate, a sealing bar having an arcuate sealing surface engageable at times with the periphery of the force plug carrier, said sealing surface and periphery of the force plug carrier being tapered whereby closing movement of the mold parts effects snug contact between said carrier and the center bar and means for automatically removing articles from the force plugs when the latter are in a position diametrically opposed to the mold charging position.

3. In apparatus for removing internally screw-threaded closures from the force plugs of a plastic molding machine wherein the force plugs are arranged in a group on one side of a force plug carrier, said apparatus comprising a frame, a chuck carrier horizontally slidingly mounted in said frame for movement toward and away from the force plugs, a plurality of rotatable axially movable chucks adapted to be telescoped over articles on the force plugs, screw-threaded rods individual to the chucks, each rod having an axial bore therethrough, a sleeve gear threaded upon each of said rods, a plurality of rack bars each operable to oscillate several of said gears, driving connection between each gear and the corresponding chuck including a spring-actuated detent at one end of the gear, an abutment formed on the adjacent end of the chuck and engageable with the detent only when the gear is rotated in one direction, and a plurality of ejector pins extending axially through the screw-threaded rods and chucks and operable by movement of the chuck carrier into engagement with the supporting frame.

4. In apparatus for removing internally screw-threaded closures from the force plugs of a plastic molding machine wherein the force plugs are arranged in a group on one side of a force plug carrier, the closures formed with exterior longitudinal ribs, said apparatus comprising a frame, a chuck carrier horizontally slidingly mounted in said frame toward and away from the force plugs, a plurality of rotatable chucks adapted to be telescoped over articles on the force plugs, screw-threaded rods individual to the chucks mounted upon the chuck carrier, a sleeve gear threaded upon each of said rods, rack bars arranged to oscillate a plurality of the sleeve gears, driving connection between each sleeve gear and a chuck whereby rotation of the sleeve gear in one direction positively drives the chuck while rotation of the sleeve gear in the reverse direction provides only for frictional driving connection between said sleeve gear and chuck, each chuck being formed with axially extending flutes engageable with the ribs on said articles carried by the force plugs, and devices carried by said frame and the exterior peripheral portions of the chucks for orienting the chucks and effecting registration of the flutes and ribs prior to axial movement of the chucks into engagement with the articles.

5. In apparatus for removing internally screw-threaded closures from the force plugs of a plastic molding machine wherein the force plugs are arranged in a group on one side of a force plug carrier, said apparatus comprising a frame, a chuck carrier horizontally slidingly mounted in said frame toward and away from the force plugs, a plurality of rotatable chucks adapted to be telescoped over articles on the force plugs, screw-threaded rods individual to the chucks mounted upon the chuck carrier, a sleeve gear threaded upon each of said rods, rack bars arranged to oscillate a pluarlity of the sleeve gears, driving connection between each sleeve gear and a chuck whereby rotation of the sleeve gear in one direction positively drives the chuck while rotation of the sleeve gear in the reverse direction provides only for frictional driving connection between said sleeve gear and chuck, means for rotating the chucks prior to engagement thereof with the articles to thereby pre-register axially extending rib-like formations on the exterior surface of the articles with rib receiving grooves on the chuck, and finger and abutment means for limiting rotation of the chucks in one direction to thereby insure the accuracy of said pre-registration of the ribs and grooves.

6. In an injection molding machine, an elongate horizontal base, frame members rising from the base at spaced points along the latter, a pair of horizontal tie-rods extending longitudinally of the base and supported in the frame members, said tie-rods being spaced apart horizontally and positioned in parallel relationship, a vertical stationary die platen positioned between and supported on said rods, a horizontal injector nozzle for plasticized molding material mounted in and projecting beyond one vertical side of the platen with its axis extending longitudinally of the machine, a cavity mold plate disposed in parallel spaced relationship to said one vertical side of the platen and supported for longitudinal reciprocation on the tie-rods, two horizontally spaced groups of cavity molds on that face of the cavity mold plate nearest the platen, a pair of disk-like carriers for mold cores parallel to and in a plane between the cavity mold plate and platen, two diametrically opposed groups of cores on that face of each carrier remote from the platen, each carrier being coaxial with a tie-rod and mounted thereon for oscillation through an angle of 180° about the axis of the tie-rod whereby to alternately position the cores one group at a time in register with one of the two groups of cavity molds and at an article discharge station, means common to the carriers for oscillating them simultaneously, a runner plate positioned between the platen and core carriers, said runner plate formed with runners communicating with the injector nozzle, each core having an axial sprue opening extending entirely therethrough and communicating with the runners and sprue and runner ejecting means.

7. In an injection molding machine, a horizontal elongated base, upright frame members spaced apart along the base, a pair of tie-rods extending lengthwise of the base through and supported in said frame members, said tie-rods disposed in parallel horizontal spaced relationship, a fixed vertical platen positioned between and mounted upon the tie-rods, a fixed vertical runner plate supported upon the tie-rods adjacent to one face of said platen, a vertically disposed cavity mold plate spaced horizontally from the runner plate and positioned between and mounted for longitudinal movement upon the tie-rods, two groups of cavity molds on the cavity mold plate, said groups of said cavity molds being spaced apart horizontally in a direction transverse to the length of the machine with open ends facing both the runner plate and platen, a disc-like mold core carrier coaxial with and mounted for oscillation upon each tie-rod, said carriers lying in a common vertical plane extending across the machine between the runner plate and cavity mold plate, two diametrically opposed groups of cores on each carrier for cooperation one group at a time with a group of the cavity molds, each core having an axial sprue opening extending therethrough to the runner plate, cavity mold charging means comprising an injection nozzle extending horizontally through the platen and connectable with the runner plate at a point substantially midway between the tie-rods, means for separating the cavity mold plate from the core carriers by axial movement of the former following a forming operation, means common to the core carriers for rotating them in opposite directions through an angle of approximately 180° following said axial movement of the cavity mold plate to thereby place two groups of cores with finished articles thereon at two article discharging stations located outwardly of the tie-rods while positioning two other groups of cores in register with the cavity molds.

8. A machine as defined in claim 7, the means for rotating the core carriers comprising a pinion coaxial with and supported on each tie-rod, means connecting each pinion to a core carrier, a reciprocable rack meshing with each pinion and means for reciprocating both racks simultaneously.

References Cited in the file of this patent
UNITED STATES PATENTS

| | | |
|---|---|---|
| 2,137,539 | McIntosh | Nov. 22, 1938 |
| 2,226,326 | Scott | Dec. 24, 1940 |
| 2,333,059 | Tucker | Oct. 26, 1943 |
| 2,439,782 | Schmid et al. | Apr. 13, 1948 |
| 2,531,524 | Nichols et al. | Nov. 28, 1950 |
| 2,645,815 | Quarnstrom | July 21, 1953 |